United States Patent [19]

Belmont

[11] Patent Number: 5,069,614
[45] Date of Patent: Dec. 3, 1991

[54] CORE ROD FOR THE INJECTION BLOW-MOULDING OF A BOTTLE WITH AN INCLINED NECK

[75] Inventor: Pierre Belmont, Arques la Bataille, France

[73] Assignee: Kerplas S.N.C., Cedex, France

[21] Appl. No.: 524,058

[22] Filed: May 16, 1990

[51] Int. Cl.⁵ .............................................. B29C 49/06
[52] U.S. Cl. .................................... 425/525; 264/537; 425/533; 425/535
[58] Field of Search ....................... 425/535, 533, 525; 264/537

[56] References Cited

U.S. PATENT DOCUMENTS

| | | | |
|---|---|---|---|
| 3,106,745 | 10/1963 | King | 425/525 |
| 3,408,692 | 11/1968 | Schaich | 425/535 X |
| 3,508,295 | 4/1970 | Hough et al. | 425/525 |
| 3,608,017 | 9/1971 | Clines | 264/529 |
| 4,019,849 | 4/1977 | Farrell | 425/445 |
| 4,150,689 | 4/1979 | Britten | 425/535 X |
| 4,244,913 | 1/1981 | Ryder | 425/535 X |

FOREIGN PATENT DOCUMENTS 2446163 8/1980 France .
51-073068 6/1976 Japan .

Primary Examiner—Richard L. Chiesa
Attorney, Agent, or Firm—Sherman and Shalloway

[57] ABSTRACT

The core rod according to the invention includes a first part (A) for mounting on an injection blow-moulding machine and a second part (B) intended to be received in a mould having an inclined cylindrical stage (30), an inclined part (34) and a connecting zone (36), in order, by the injection blow-moulding technique, to produce a bottle in one piece which has a neck inclined relative to the axis of the bottle.

4 Claims, 3 Drawing Sheets

CORE ROD FOR THE INJECTION BLOW-MOULDING OF A BOTTLE WITH AN INCLINED NECK

The invention relates to a core rod for producing a bottle with an inclined neck by the injection blow-moulding technique.

One-piece plastic bottles having a neck inclined, for example, at 20° relative to the axis of the bottle are conventionally produced by the extrusion blow-moulding technique.

This technique does not guarantee a very good surface state inside the neck, and this can lead to difficulties, for example in fitting a spreading adaptor inside the neck or a pouring spout. Moreover, the dimensional variations in the upper part of the bottle which are inherent in this technique limit the rate of assembly of such an adaptor. Finally, if the adaptor is to be protected by a cap, the latter, which must be positioned on the base of the neck, does not always absorb the dimensional differences attributable to the extrusion blow-moulding technique.

A technique for the working of plastics, such as injection blow-moulding, uses cylindrical core rods which make it impossible to produce bottles of which the neck is inclined at more than a few degrees relative to the axis of the bottle.

The machines used for injection blow-moulding are equipped with three stations.

At the first station, called an injection station, a core rod having the form of a hollow cylinder is surrounded by a mould, the walls of which are parallel and only a short distance from those of the core rod. Plastic is injected under pressure there into the space present between the core rod and the mould. When this operation has been carried out, the mould is opened and the core rod and plastic coating it are transferred to the blow-moulding station.

At the blow-moulding station, the core rod and its coating are inserted into a mould, the walls of which have the shape of the desired bottle and are set apart from the material coating the core rod. By blowing air under pressure by means of the conduit provided inside the core rod and of a valve feeding some orifices, the plastic is laid forcibly onto the walls of the mould. The bottle is formed in this way. The mould is subsequently opened, and the core rod surrounded by the bottle is transferred to the ejection station.

At the ejection station, the bottle is separated from the core rod which is thus ready for another operation. For this purpose, the neck of the bottle is slid along the cylindrical core rod. Consequently, the neck can be inclined at only a few degrees relative to the axis of the core rod which corresponds to the vertical when the bottom of the bottle is placed on a horizontal plane.

To overcome the disadvantages of the extrusion blow-moulding process, the object of the present invention is to provide a core rod making it possible by injection blow-moulding to produce a bottle having a neck inclined at approximately 20° relative to the vertical.

SUMMARY OF THE INVENTION

To achieve this, the subject of the invention is a core rod for producing a plastic bottle by injection blow-moulding, this bottle have a neck inclined relative to the axis of the body of the bottle, the core rod comprising a first part for mounting on an injection blow-moulding machine, extended by a second part intended to be positioned inside a cavity of a mould and comprising a first section which, when in position, is in contact with a first wall part of the mould cavity, and a second section extending the first section and intended, when in position, to be surrounded with play by a second wall part, there passing through the first and second parts of the core rod a straight axial blowing conduit, of which a connecting end opens out onto an end face of the first mounting part and a blowing end opens out at the free end of the core rod, characterized in that the said first section comprises a cylindrical stage inclined relative to the axis of the conduit, and in that the said second section comprises an inclined cylindrical part coaxial relative to the said inclined cylindrical stage, an axial cylindrical end part coaxial with the conduit and a connecting zone connecting the said inclined cylindrical part to the said axial cylindrical part.

The process for producing a plastic bottle having an inclined neck comprises the steps of (a) forming a parison around a core rod having a first cylindrical body section and a portion inclined relative to the longitudinal axis of the cylindrical body section and a straight axial blowing conduit which traverses the length of the core rod including said cylindrical body section and inclined portion, (b) positioning the parison and core rod within a blowing mold comprising two parts which form a wall having the desired form for the outer face of the bottle and which parts are separated by an inclined plane having the same angle of inclination as that of said inclined portion;

(c) blowing compressed air through said blowing conduit whereby air infiltrates between the core rod and parison except in the area of the inclined portion of the core rod, thereby forcing the parison onto the walls of the mold to form a bottle having an inclined neck;

(d) allowing the bottle to cool and harden; and (e) removing the core-rod by exerting a pull on the bottle in a direction parallel to the axis of the inclined cylindrical part of the core rod to release the neck of the bottle and exerting a second pull on the bottle in a direction parallel to the longitudinal axis of the core rod and sliding the bottle along the longitudinal axis of the core rod.

According to other characteristics:

the inclined cylindrical stage forms with the axis of the conduit an angle substantially equal to the angle of the neck of the bottle in relation to the axis of the bottle;

the inclined cylindrical stage has an outside diameter substantially equal to the outside diameter of the neck of the bottle, and the said inclined cylindrical part has an outside diameter corresponding substantially to the inside diameter of the neck;

the said angle of inclination is between 3° and 30°.

Another subject of the invention is a process for the injection blow-moulding of a bottle having a neck inclined relative to the axis of the body of the bottle, which involves using a core rod according to the invention.

BRIEF DESCRIPTION OF THE DRAWINGS

The invention will be described in more detail below with reference to the accompanying drawings in which.

DESCRIPTION OF THE PREFERRED EMBODIMENTS

Figure 1:
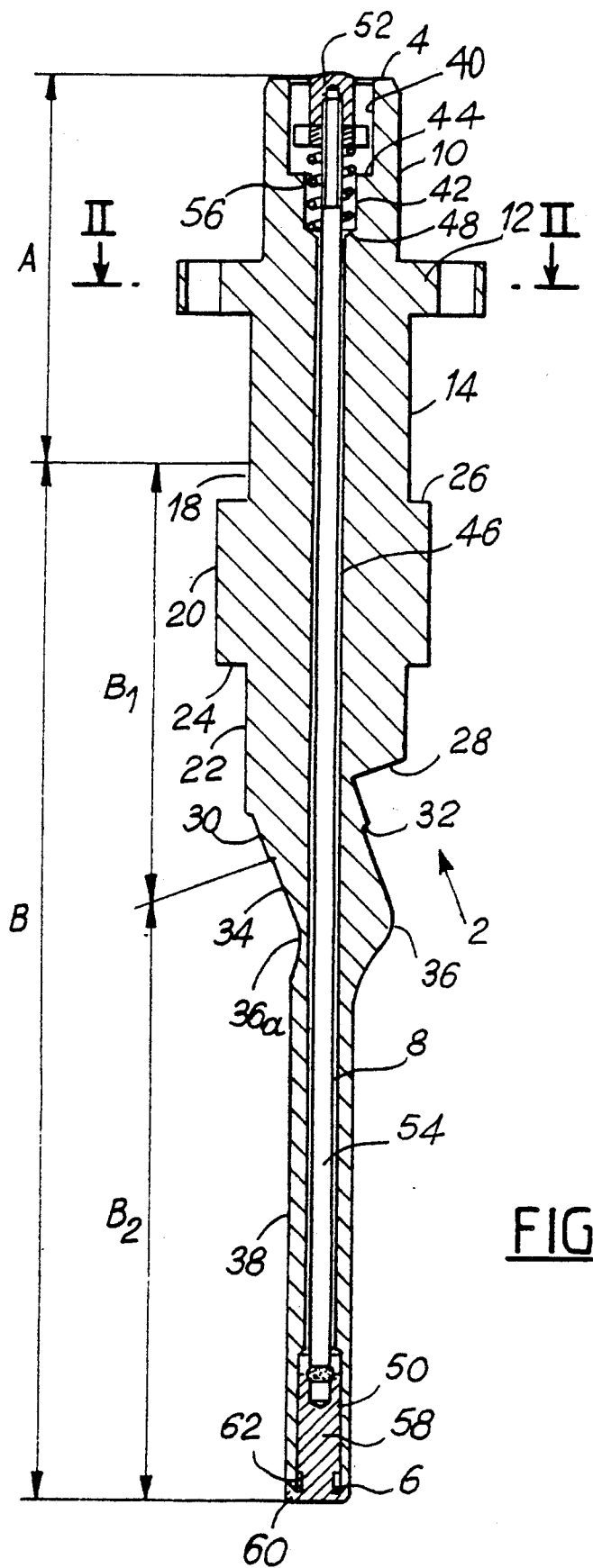
FIG. 1 is a view in axial section of a core rod according to the invention.

FIG. 1 illustrates a core rod 2 according to the invention in axial section. This core rod 2 has a general stepped cylindrical form extending between an end mounting face 4 and a free end face 6 of the core rod.

An axial conduit 8 passes through the core rod 2, and its two ends open out respectively onto the faces 4 and 6.

A first core-rod part A extends from the end mounting face 4 and, starting from this face 4, comprises a first cylindrical part 10, a collar 12 and a second cylindrical part 14.

This first core-rod part A is intended to provide for the core rod to be mounted on an injection blow-moulding machine (not shown).

Figure 2:
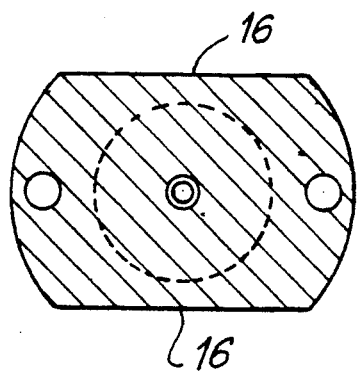
FIG. 2 is a view of the collar for fastening the core rod in the machine, in a section along 2.2 of FIG. 1.

The collar 12 shown in section in FIG. 2 has two bores for receiving screws for fastening the core rod to the machine, and two flaps 16 for ensuring the angular positioning of the core rod 2 in relation to the machine.

A second core-rod part B extends the first core-rod part A axially and goes as far as the free endface 6.

This second core-rod part B comprises a first section B1 extending the first core-rod part A and itself extended by a second section B2 going as far as the free end.

The first section B1 comprises a first coaxial cylindrical portion 18 of the same diameter as the second cylindrical part 14 of the first core-rod part A, a second coaxial portion 20 of a diameter larger than that of the first portion, and a third coaxial portion 22 of the same diameter as the first portion 18. This provides two shoulders 24 and 26 intended for interacting with abutments provided in the moulds for positioning the core rod 2 axially.

The third portion 22 has a plane end wall 28 inclined, in this example, at 20° relative to a plane perpendicular to the general axis. This angle corresponds to the desired angle of the neck of the bottle in relation to the axis of the latter.

From this end wall 28, the first section B1 terminates in an inclined cylindrical stage 30 extending perpendicularly relative to the end wall 28 and off-centre relative to this wall. The cylindrical stage 30 has a diameter equal to the outside diameter of the neck of the bottle.

It should be noted that the diameter of the third portion 22 is larger than that of the stage 30 by such an amount that the trace of the outer wall of the stage 30 on the end wall 28 is contained completely within the trace of the outer wall of the third portion 22 on this same wall 28.

As a result of the inclination of the wall 28, the stage 30 is inclined at an angle of 20° relative to the axis of the core rod.

The first portion B1 terminates in an annular shoulder 32 parallel to the end wall 28 of the third stage.

The second section B2 extends from this shoulder 32 and comprises an inclined cylindrical part 34 which extends the inclined stage 30 and the outside diameter of which corresponds substantially to the inside diameter of the neck of the bottle and which is coaxial with the stage 30.

This inclined cylindrical part 34 is extended by a connecting zone 36 with an axial cylindrical part 38 going as far as the face 6 of the free end of the core rod.

The connecting zone has a variable wall thickness, of which the minimum is shown at 36A in FIG. 1. This minimum must be sufficient to withstand the pressure of the air which will be blown into the axial conduit 8.

The axial conduit 8 is intended for receiving a blow-control device to allow compressed air to be blown through the face 6. It comprises a first cylindrical portion 40 adjacent to the connecting end, this being extended in the direction of the face 6 by a second cylindrical portion 42 of smaller diameter, thus forming a shoulder 44.

This second portion 42 is extended by a bore 46 of a diameter smaller than that of the second portion 42, a chamfer 48 making the junction between the bore 46 and the second portion 42.

In the vicinity of the face 6, the bore 46 is extended by a third portion 50 of a diameter larger than that of the bore 46 and opening out onto the face 6.

The blow-control device accommodated in the conduit 8 comprises a head 52 seated in the first portion 40 of the conduit 8, the said head being equipped with a collar intended for coming up against the shoulder 44.

This head 52 is extended by a cylindrical stem 54 extending in the second portion 42 of the conduit 8, the bore 46 and part of the third portion 50.

Between the chamfer 48 and the head 52, a helical compression spring 56 surrounds the stem 54 and stresses the head 52 towards the outside of the conduit 8.

The end of the stem 54 located in the third portion 50 of the conduit 8 is equipped with a valve 58 designed to be capable of sliding in the third portion 50 of the conduit 8 and provided with a collar 60 bearing on the face 6 which thus forms the seat of the valve.

Passages (not shown) put in communication the conduit 8 and an annular groove 62 located adjacent to the collar 60 in the valve 58.

Figure 3:
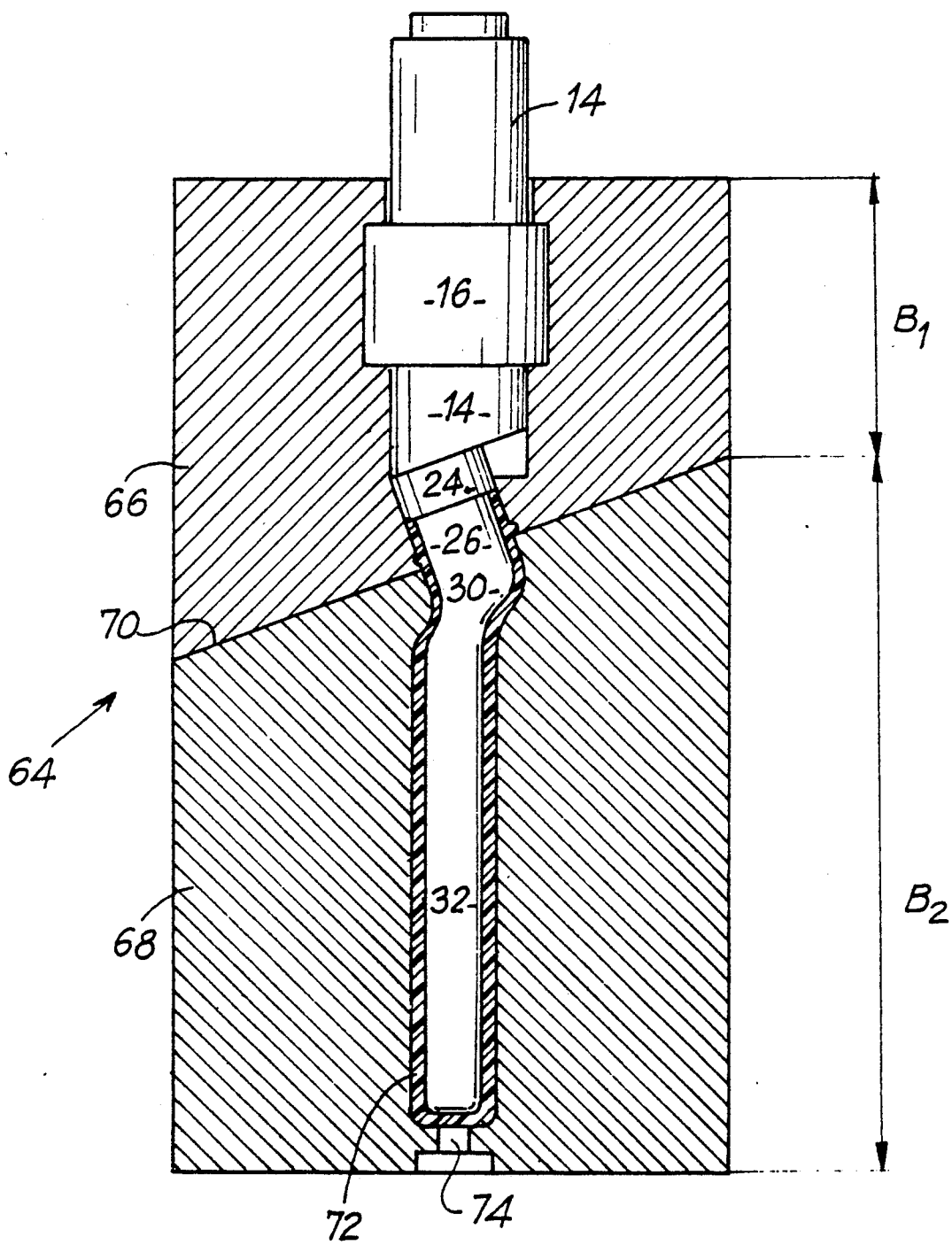
FIG. 3 is a view, partially in axial section, of a core rod in position in an injection mould.

When the core rod is brought to the injection station, as shown in FIG. 3, it is surrounded by an injection mould 64 in two halves separated along an axial plane (the drawing plane in FIG. 3). Only two parts 66 and 68 of the mould are shown. The parts 66 and 68 are laid against one another to form a seal against compressed air along an inclined plane 70 perpendicular relative to the axis of the cylindrical stage 30 and of the inclined cylindrical part 34. This plane passes approximately through the middle of this inclined cylindrical part 34.

When the four parts of the mould are assembled together, they define a cavity intended for receiving the core rod 2.

A wall part of this cavity is in contact sealing against compressed air, with clamping, with the first section B1 of the second core-rod part B.

In contrast, the wall of the cavity is at a slight distance from the walls of the second portion B2, the play corresponding substantially to the desired thickness of the bottle.

The sealed space 72 thus delimited surrounds the second section B2 and is intended for receiving under pressure the plastic which will subsequently form the bottle.

Moreover, in the lower part 62 of the mould there is an injection hole 74 opening into the space 72 in the vicinity of the face 6.

When the injection mould has been installed round the core rod, plastic is injected under pressure through the hole 74 and thus fills the space 72.

Figure 4:
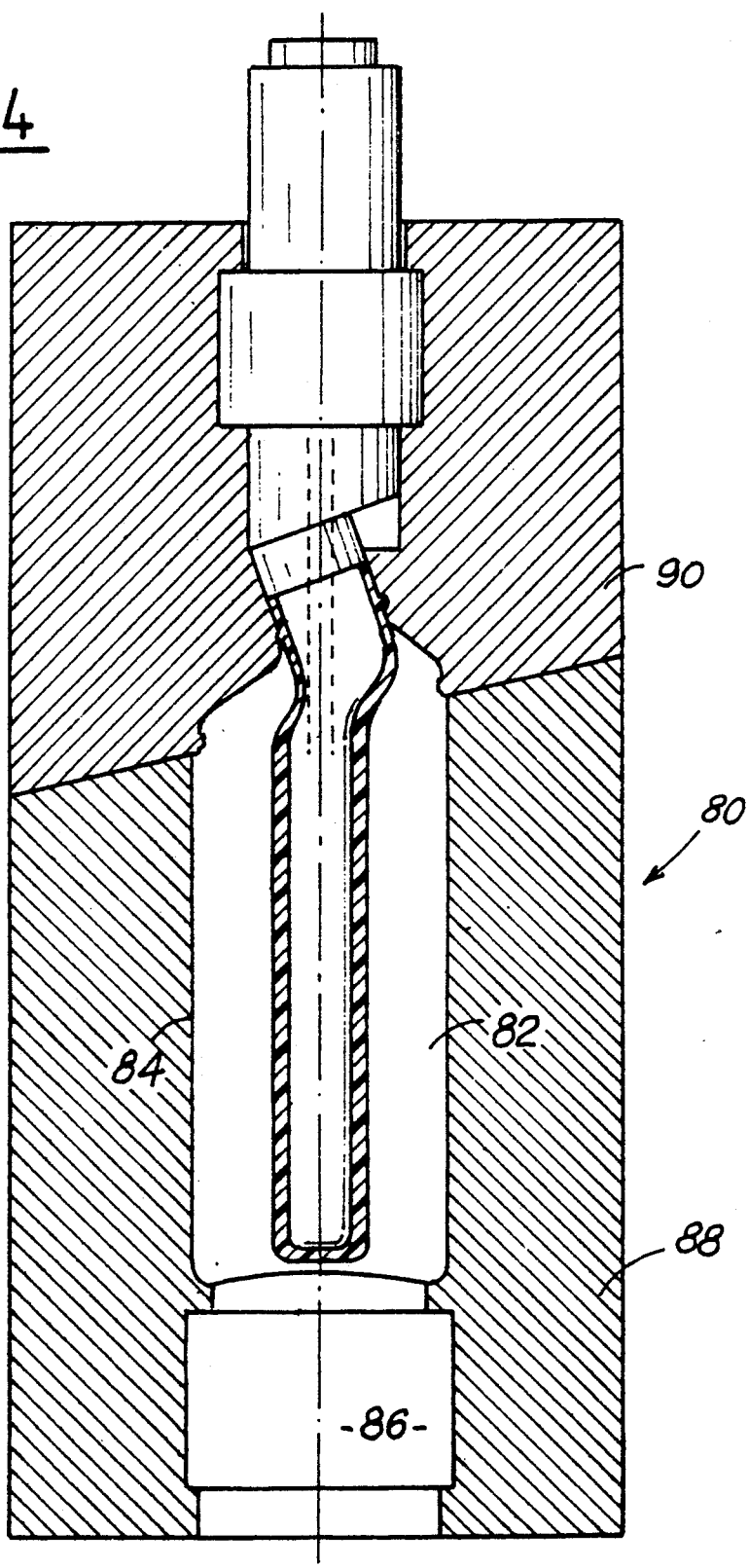
FIG. 4 is a view, partially in axial section, of a core rod covered with plastic by injection, in position in a blowing mould.

The mould is subsequently opened, and the core rod coated with plastic is conveyed to a blowing station where it is surrounded by a blowing mould, as shown in FIG. 4.

This blowing mould 80 is of a design similar to that of the injection mould 64. However, its cavity 82 possesses a wall 84 having the form desired for the outer face of the bottle.

The lower part 86, as seen in FIG. 4, is larger than the lower part of the mould 64. This lower part 86 possesses cooling means (not shown).

It will also be seen, in this example, that the inclined plane of separation of the lower part 88 and upper part 90 of the mould is located at the junction between the body of the bottle and its neck.

In this position, air is blown in by means of the control device illustrated in FIG. 1 and accommodated in the conduit 8 of the core rod 2. For this purpose, a machine device (not shown) pushes mechanically downwards on the head 48 counter to the spring 56.

The collar 60 of the valve 58 moves away from the end blowing wall 6 of the core rod 2, thereby opening a passage for the compressed air coming from the machine and passing through the axial conduit 8.

The compressed air infiltrates between the core rod and its coating of plastic and lays this onto the wall 84 of the mould 80.

After the cooling and hardening of the plastic, the mould is removed and the core rod equipped with the bottle is conveyed to an ejection station.

At this station, a pull is exerted on this bottle so as to release the neck from the core rod by sliding.

This is possible, in a first step, by exerting this pull in a direction parallel to the axis of the inclined cylindrical part 34.

In a second step, the elasticity of the wall of the neck of the bottle allows it, as a result of a pull parallel to the axis of the core rod, to slide along the connecting zone 36 and then the axial cylindrical part 38.

A core rod making it possible to produce a bottle having a neck highly inclined relative to the vertical by means of an injection blow-moulding machine has thus been provided. The bottle produced possesses a good surface state inside the neck and exact dimensions in its upper part.

I claim:

1. A core rod (2) for producing a plastic bottle by injection blow-moulding, said bottle having a neck inclined relative to the axis of the body of the bottle, the core rod comprising a first part (A) for mounting on an injection blow-moulding machine, extended by a second part (B), capable of being positioned inside a cavity of a mould and comprising a first section ($B_1$) which, when in position, is in contact with a first wall part of the mould cavity, and a second section ($B_2$) extending the first section and, when in position, surrounded with play by a second wall part of the mould cavity, there passing through the first (A) and second (B) parts of the core rod a straight axial blowing conduit (8), of which a connecting end opens out onto an end face (4) of the first mounting part (A) and a blowing end (6) which opens out at the free end of the core rod, wherein the said first section ($B_1$) comprises a cylindrical stage (30) inclined relative to the axis of the conduit (8), and in that the second section ($B_2$) comprises an inclined cylindrical part (34) coaxial relative to the said inclined cylindrical stage (30), an axial cylindrical end part (38) coaxial with the conduit and a connecting zone (36) connecting the said inclined cylindrical part (34) to the said axial cylindrical part (38).

2. A core rod according to claim 1, wherein the inclined cylindrical stage (30) forms with the axis of the conduit (8) an angle substantially equal to the angle of the neck of the bottle in relation to the axis of the bottle.

3. A core rod according to claim 2, wherein the inclined cylindrical stage (30) has an outside diameter substantially equal to the outside diameter of the neck of the bottle, and the inclined cylindrical part (34) has an outside diameter corresponding substantially to the inside diameter of the neck.

4. A core rod according to claim 2, wherein said angle of inclination is between 3 and 30°.

* * * * *